(12) United States Patent
Kim et al.

(10) Patent No.: US 10,071,855 B2
(45) Date of Patent: Sep. 11, 2018

(54) FLOATING ACTIVE BAFFLES, SYSTEM AND METHOD OF SLOSH DAMPING COMPRISING THE SAME

(71) Applicant: Embry-Riddle Aeronautical University, Inc., Daytona Beach, FL (US)

(72) Inventors: Dae Won Kim, Daytona Beach, FL (US); Rudy L. Baum, Hampton, FL (US); Vijay Santhanam, Tamil Nadu (IN); Balaji Sivasubramanian, Daytona Beach, FL (US); Sathya Gangadharan, Ormond Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 164 days.

(21) Appl. No.: 15/206,517

(22) Filed: Jul. 11, 2016

(65) Prior Publication Data
US 2016/0318708 A1    Nov. 3, 2016

Related U.S. Application Data

(63) Continuation of application No. PCT/US2015/010602, filed on Jan. 8, 2015.
(Continued)

(51) Int. Cl.
*B60K 15/077* (2006.01)
*B65D 90/52* (2006.01)
(Continued)

(52) U.S. Cl.
CPC .......... *B65D 90/52* (2013.01); *B60K 15/077* (2013.01); *B60K 2015/0344* (2013.01);
(Continued)

(58) Field of Classification Search
CPC .... B60K 2015/0772; B60K 2015/0775; B60K 2015/0777; B60K 2015/0344;
(Continued)

(56) References Cited

U.S. PATENT DOCUMENTS

| 1,671,650 | A | * | 5/1928 | Newman | ................ | B65D 90/42 |
|---|---|---|---|---|---|---|
| | | | | | | 169/26 |
| 3,110,318 | A | * | 11/1963 | Eulitz | ................... | B64D 37/32 |
| | | | | | | 137/1 |

(Continued)

FOREIGN PATENT DOCUMENTS

| JP | 4201697 A | 7/1992 |
|---|---|---|
| JP | 7004963 A | 1/1995 |

(Continued)

OTHER PUBLICATIONS

International Search Report for PCT/US2015/010602, dated Apr. 2, 2015.

(Continued)

*Primary Examiner* — J. Gregory Pickett
*Assistant Examiner* — Gideon Weinerth
(74) *Attorney, Agent, or Firm* — Womble Bond Dickinson (US) LLP

(57) ABSTRACT

This disclosure provides a system for damping slosh of a liquid within a tank, a baffle for use in the system, and a method of damping slosh using the system. The system includes a plurality of baffles. Each baffle has a body configured to substantially float upon the liquid. Each baffle also has an activation material received along at least a portion of the body. The activation material is magnetically reactive provided in a quantity sufficient to enable the body to be manipulated in the presence of a magnetic field (M). The system further includes an actuator configured to provide the magnetic field (M).

20 Claims, 16 Drawing Sheets

Related U.S. Application Data

(60) Provisional application No. 61/926,799, filed on Jan. 13, 2014.

(51) Int. Cl.
  *B64G 1/40* (2006.01)
  *B60K 15/03* (2006.01)
  *F02K 9/60* (2006.01)

(52) U.S. Cl.
  CPC .............. *B60K 2015/0772* (2013.01); *B60K 2015/0775* (2013.01); *B60K 2015/0777* (2013.01); *B64G 1/401* (2013.01); *F02K 9/605* (2013.01)

(58) Field of Classification Search
  CPC ....... B60K 15/077; B63B 35/00; B63B 35/44; B63B 2035/4453; B63B 2035/4493; B63B 2035/4486; B65D 2590/0083; B65D 88/34; B65D 88/36; B65D 90/42; E04H 4/08; E04H 4/143; F17C 3/00; F17C 13/00; B64G 1/401; F02K 9/605
  USPC ......... 220/563, 216–222, 734; 114/312, 261, 114/264, 266, 267; 126/565, 566; 136/243; 405/52, 303; 4/498, 496, 497, 4/499
  See application file for complete search history.

(56) References Cited

U.S. PATENT DOCUMENTS

| | | | |
|---|---|---|---|
| 3,665,882 A * | 5/1972 | Georgiev | B63B 35/34 114/266 |
| 3,925,991 A * | 12/1975 | Poche | E02B 15/08 405/65 |
| 3,938,338 A * | 2/1976 | Cullen | B01J 19/16 220/216 |
| 4,067,285 A * | 1/1978 | Jones | B63B 5/18 114/266 |
| 4,447,743 A | 5/1984 | Bean et al. | |
| 4,475,290 A | 10/1984 | Colditz | |
| 4,844,974 A | 7/1989 | McCullough, Jr. et al. | |
| 4,863,055 A | 9/1989 | Bietz | |
| 5,125,355 A * | 6/1992 | Stranzinger | B63B 35/38 114/218 |
| 5,188,550 A * | 2/1993 | Oliver | F24J 2/0472 126/567 |
| 5,279,323 A * | 1/1994 | Grove | F17C 9/00 137/154 |
| 5,398,840 A * | 3/1995 | Luhman | B32B 5/26 210/508 |
| 5,888,393 A * | 3/1999 | Luhman | C03C 11/002 210/263 |
| 6,220,287 B1 | 4/2001 | Wolf | |
| 6,220,472 B1 * | 4/2001 | Townsend | B64D 37/08 220/563 |
| 6,283,412 B1 | 9/2001 | Mango | |
| 6,568,556 B1 | 5/2003 | Kahler, Jr. et al. | |
| 7,387,473 B2 * | 6/2008 | Smith | B65D 88/36 405/303 |
| 7,604,256 B2 | 10/2009 | Reber | |
| 7,648,749 B1 | 1/2010 | Taylor | |
| 8,235,241 B2 * | 8/2012 | Ramsay | B60K 15/077 220/216 |
| 8,590,565 B2 | 11/2013 | Watanabe et al. | |
| 8,708,190 B2 * | 4/2014 | Chun | B65D 90/52 220/563 |
| 9,004,308 B2 | 4/2015 | Spencer et al. | |
| 9,599,284 B2 * | 3/2017 | Shin | B63B 25/08 |
| 2004/0134916 A1 * | 7/2004 | Bambacigno | B60P 3/2235 220/563 |
| 2007/0096453 A1 | 5/2007 | Reber | |
| 2009/0078705 A1 * | 3/2009 | Ramsay | B60K 15/077 220/562 |
| 2010/0320329 A1 | 12/2010 | Boelitz et al. | |
| 2011/0278305 A1 * | 11/2011 | Chun | B65D 90/52 220/563 |
| 2013/0121766 A1 * | 5/2013 | Birger | A63H 23/10 405/52 |
| 2013/0146127 A1 * | 6/2013 | Lunoe | B63B 35/44 136/251 |
| 2013/0153179 A1 | 6/2013 | Davies et al. | |
| 2015/0059079 A1 * | 3/2015 | Alirol | B65D 88/36 4/499 |
| 2015/0352945 A1 | 12/2015 | Matusek et al. | |
| 2016/0059938 A1 * | 3/2016 | Momayez | H02S 10/40 440/6 |
| 2016/0203901 A1 * | 7/2016 | Sivasubramanian | B64G 1/402 361/144 |
| 2016/0318708 A1 * | 11/2016 | Kim | B65D 90/52 |
| 2016/0368373 A1 * | 12/2016 | Dudar | B60K 15/077 |
| 2017/0085213 A1 * | 3/2017 | Petrin | H02S 40/36 |
| 2017/0253426 A1 * | 9/2017 | Boyer | E04H 4/08 |

FOREIGN PATENT DOCUMENTS

| | | |
|---|---|---|
| JP | 2011184087 A | 9/2011 |
| WO | WO 2015/105961 A1 | 7/2015 |

OTHER PUBLICATIONS

Written Opinion for PCT/US2015/010602, dated Apr. 2, 2015.

Sivasubramanian, Balaji, Rosario, Leander Paul, Krishnappa, Sanjay, and Gangadharan, Sathya, "A Hybrid Magneto-active Propellant Management Device for Active Slosh Damping in Spacecraft", American Institute of Aeronautics and Astronautics, pp. 1-9, Embry-Riddle Aeronautical University, Daytona Beach, FL 32114.

Gangadharan, Sathya N., "Parameter Estimation of Spacecraft Nutation Growth Model", H-1/H-4, Center, John F. Kennedy Space, 2003.

Chatman, Yadira, Ganngadharan, Sathya, Marsell, Brandon, and Hubert, Carl, "Mechanical Analog Approach to Parameter Estimation of Lateral Spacecraft Fuel Slosh", 2008.

Burke, Caley Ann, "Nutation in the spinning SPHERES spacecraft and fluid slosh", PhD diss., Massachusetts Institute of Technology, 2010.

Loads, Propellant Slosh, "NASA Space Vehicle Design Criteria Monograph (Structures)", *NASA SP-8009*, Aug. 1968.

Vreeburg, Jan P.B., "Spacecraft Maneuvers and Slosh Control", IEEE Control Systems Magazine, Jun. 2005, pp. 12-16.

Suppression, Slosh. "NASA Space Vehicle Design Criteria (Structures)", *NASA SP-8031*, May 1969. Ell.

Stephens, David G., "Flexible baffles for slosh damping", Journal of Spacecraft and Rockets 3.5 1966: pp. 765-766.

Santhanam, Vijay, Baum, Rudy, Kim Daewon, and Gangadharan, Sathya, "Slosh Damping with Floating Electro-active Microbaffles", 55th AIAA/ASMe/ASCH/AHS/SC Structures, Structural Dynamics, and Materials Conference, Jan. 13-17, 2014, National Harbour, Maryland, AIAA 2014-0693.

Benson, David J., and Mason, Paula, "Method for CFD Simulation of Propellant Slosh in a Spherical Tank", 2011.

Lenahen, Brian, et al., "A Computational Investigation for Determining the Natural Frequencies and Damping Effects of Diaphragm-Implemented Spacecraft Propellant Tanks", 53rd AIAA/ASME/ASCE/AHS/ASC Structures, Structural Dynamics and Materials Conference 20th AIAA/ASME/AHS Adaptive Structures Conference 14th AIAA, 2012.

Dhawal, Leuva, Sathyanarayan, Priya, Sathyanarayan, Deepak, and Gangadharan, Sathya, "Experimental Investigation and CFD Simulation of Active Damping Mechanisms for Propellant Slosh in Spacecraft and Launch Vehicles".

Schlee, K., Gangadharan, S.N., Ristow, J., Sudermann, J., Walker, C., and Hubert, C., "Modeling and Parameter Estimation of Spacecraft Fuel Slosh", 29th Annual AAS Guidance and Control Confer-

(56) References Cited

OTHER PUBLICATIONS ence, Paper# AAS-06-027, American Astronautical Society, Rocky Mountain Section, Breckenridge, Colorado, 2006.

Sances, D.J., Gangadharan, S.N., Sudermann, J.E., and Marsell, B., CFD Fuel Slosh Modeling of Fluid-Structure Interaction in Spacecraft Propellant Tanks with Diaphragms and Proceedings, 2010.

Santhanam, V., "Slosh Damping using Floating Magnetoactive Micro-baffles", M.S. Thesis Dissertation, Aerospace Engineering Dept., Embry-Riddle Aeronautical Univ., Daytona Beach, FL, 2014.

* cited by examiner

FLOATING ACTIVE BAFFLES, SYSTEM AND METHOD OF SLOSH DAMPING COMPRISING THE SAME

CROSS REFERENCE TO RELATED APPLICATIONS

The present patent application is a continuation application of previously filed, co-pending PCT Application No. PCT/US2015/10602, filed Jan. 8, 2015, entitled "Floating Active Baffles, System and Method of Slosh Damping Comprising the Same," which PCT application claims the benefit of U.S. Provisional Patent Application Ser. No. 61/926,799, filed Jan. 13, 2014 by the inventors named in the present application. This patent application claims the benefit of the filing date of the cited Provisional Patent Application according to the statutes and rules governing provisional patent applications, particularly 35 U.S.C. § 119(e), and 37 C.F.R. §§ 1.78(a)(3) and 1.78(a)(4). The entire disclosures of both PCT Application No. PCT/US2015/10602 and U.S. Provisional Patent Application No. 61/926,799 are specifically incorporated herein by reference as if set forth in their entirety.

TECHNICAL FIELD

Embodiments of this disclosure generally relate to mechanisms for managing sloshing in liquid containers and, more particularly, to active damping mechanisms for liquid slosh suppression.

BACKGROUND

The presence of liquid in a tank which is exposed to dynamic conditions has been under review for quite some time. Such scenarios may occur in liquid propellant rockets, aircraft propellant tanks, ships, petroleum tankers, and other applications in which fluids are contained for transport. Sloshing of a liquid can cause the tank system to deviate due to the buildup of kinetic energy of the liquid and its consequent interaction with the walls of the container.

In aerospace technology, sloshing is a well-recognized problem, particularly in liquid propellant launch vehicles, which tend to have an enormous percentage of their initial weight as fuel. When slosh waves are allowed to freely oscillate, they have a tendency to reach resonance. At resonance, slosh waves generally have maximum amplitude. The forces of sloshing propellant can cause the spacecraft to nutate about its spin axis. Traditionally, thrust vector correction methods are used to correct the nutation in the spacecraft. However, the high magnitudes of propellant sloshing forces can overpower the corrections being made. This can result in an increase in nutation and complete loss of the control of the spacecraft.

Movement imparted to a liquid containing tank can cause the liquid to slosh within the tank. Liquid sloshing often results in the periodic motion of liquid with the free surface in a liquid container. The hydrodynamic forces exerted due to sloshing pose a risk to the structural integrity of the tank walls. This concern is especially augmented with the constantly increasing size of space vehicles and rocket vehicle propellant containers and the significant dynamic forces these containers are exposed to.

To counteract the effects of liquid slosh, various propellant management devices (PMD) have been proposed and placed into use that involve both passive structural devices and active mechanisms. Passive systems are understood to operative without outside influence. Active systems are understood to operate by influencing the liquid or elements of the tank system in a controllable manner. FIG. 1 illustrates known slosh reduction techniques including diaphragms, baffles, and acoustic damping. A diaphragm is one type of passive PMD that is implemented within the propellant tank itself. As the liquid propellant leaves the tank, the diaphragm compresses and lessens the amount of surface area in which the liquid would originally slosh.

A baffle is another type of passive PMD that creates a simple barrier that acts to restrict the physical motion of the liquid, thus damping the amount of slosh it can exhibit. The two main types of baffles are wall-fixed and floating. Each baffle type is accompanied by its own set of advantages and disadvantages. The primary advantage of floating baffles is the reduced weight over the wall-fixed counterparts. Additionally, wall-fixed baffles are limited in their placement with respect to the tank walls due to the presence of supporting structures which may be located on the tank walls. Floating baffles have shown some effectiveness in part because they interact by colliding with one another, thus absorbing the kinetic energy imparted to the fuel upon movement of the tank. Other baffle methods have some effectiveness by increasing the natural frequency of the tank sections and decreasing the wave amplitude at the free surface. Often, however, passive PMDs are effective across a limited range of propellant slosh frequency; they take up space in the fuel tank and are relatively heavy and bulky. Thus, the weight to operation range ratio of passive PMDs is poor.

One type of active damping mechanism physically creates waves that destructively interfere with the liquid propellant undergoing sloshing. By changing the frequency at which these waves are created, the magnitude of the sloshing waves can be controlled. However, unlike the passive PMDs, this active mechanism is not believed to have been applied to any commercial use.

Therefore there remains a need for additional mechanisms for damping of liquid slosh within a container.

SUMMARY

The present disclose describes a baffle for damping movement of a liquid within a tank, vessel or container. The baffle may comprise a body configured to float upon a surface of the liquid and an activation material received within the body. The activation material may be a magnetically permeable material where the body is provided with a volume of activation material sufficient to enable the body to be manipulated in the presence of a magnetic field while substantially remaining afloat in the liquid.

In some embodiments the activation material has a magnetic permeability of at least 5,000. In some embodiments the body is constructed with an air chamber at least partially surrounded by the activation material. In some embodiments the body has a top wall, a bottom wall, and a peripheral wall, and the top surface has a substantially triangular shape. In some embodiments the body comprises a material having a low density and low reactivity with the liquid in which the baffle is placed.

The present disclosure also describes a system for damping slosh of a liquid within a tank. The system comprises a plurality of baffles and an actuator configured to provide a magnetic field. Each baffle may have a body configured to substantially float upon the liquid and an activation material received along at least a portion of the body. The activation material may comprise a magnetically reactive material in a quantity sufficient to enable the body to be manipulated in the presence of the magnetic field.

In some embodiments, the actuator comprises a magnet, such as an electromagnet, having an axis between opposite poles thereof, and the magnet is positioned with respect to the tank and the liquid such that the axis is substantially parallel to a slosh direction of the liquid within the tank, and substantially along a free surface of the liquid during equilibrium. In some embodiments the magnet is configured to be mounted outside of the tank. In other embodiments, the magnet is configured to be mounted within the tank. In some embodiments, the actuator is adapted to be movable relative to the tank to adjust for changes in the volume of liquid within the tank.

The present disclosure also describes a method of damping slosh of a liquid held within a tank. The method may include floating a plurality of baffles upon a surface of the liquid, each baffle comprising a body configured to substantially float upon the liquid and having an activation material therein, the actuation material provided in quantity sufficient to enable the baffle to be manipulated in the presence of a magnetic field. The method may further include creating a magnetic field in proximity to the liquid and moving the baffles into a semi-rigid structural layer substantially floating along the surface of the liquid in response to the magnetic field.

In some embodiments, creating the magnetic field comprises passing a current through an electromagnet. In some embodiments the method also includes adjusting the current passing through the electromagnet to change a rigidity of the structural layer created by the baffles. In some embodiments, creating the magnetic field comprises aligning an axis of a magnet generally parallel with a slosh direction of the liquid, and with the axis generally extending along the free surface during equilibrium. In some embodiments the method also includes adjusting the position of the magnet creating the magnetic field as a volume of liquid within the tank changes.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

The following detailed description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

The present disclosure describes a system and method of damping fluid slosh using active baffles. The active baffles are configured to provide a structural layer to constrain the free surface of the liquid in a tank or other container. The structural layer is understood to increase in rigidity as the baffles are activated and the strength of a magnetic field increases. The system, or parts thereof, may be referred to as a propellant management device (PMD) used for managing liquid propellant within fuel tanks on vehicles such as rockets, aircraft and ships. The system may also have beneficial uses in other environments, such as tanker trucks transporting liquid beyond their own fuel. Therefore the system of the present disclosure is not necessarily limited to a PMD.

Figure 1:
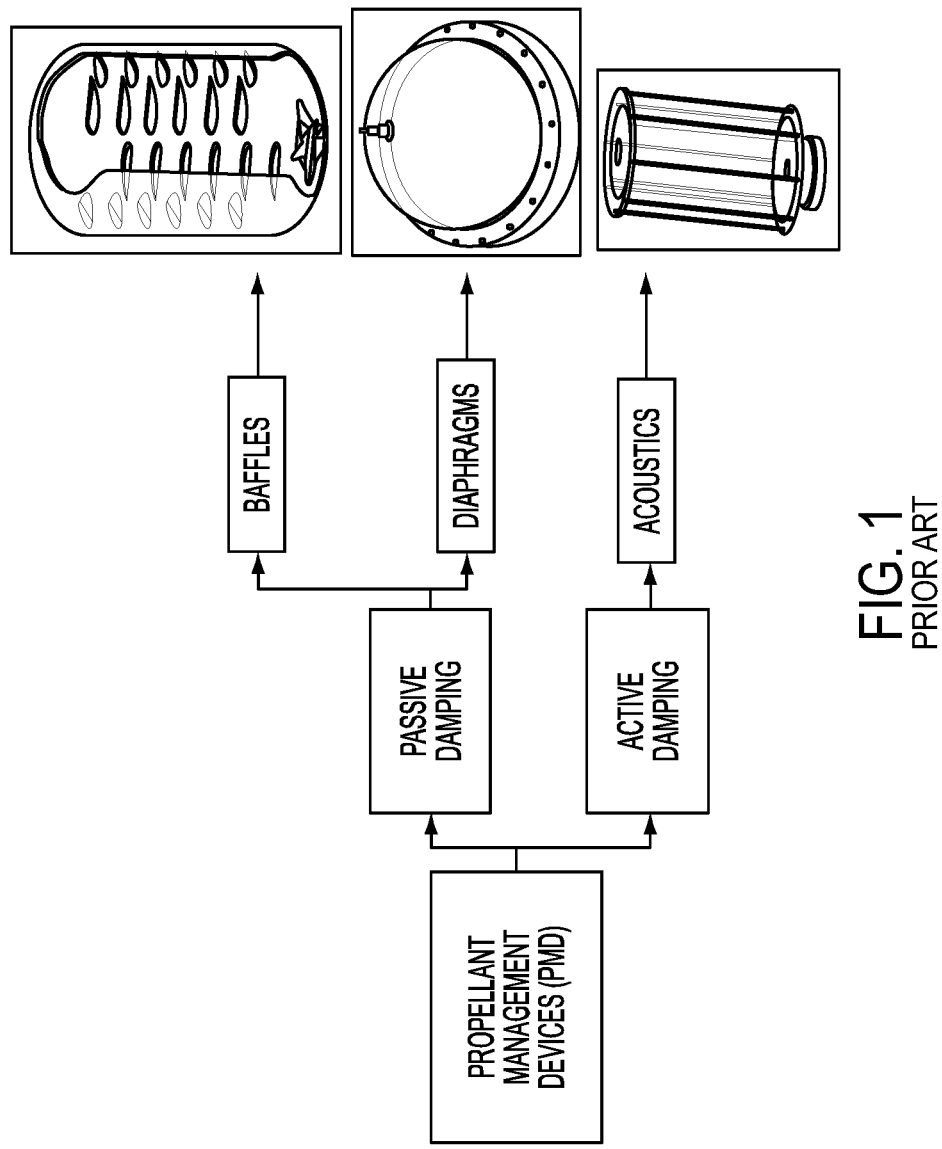
FIG. 1 illustrates known slosh reduction techniques including diaphragms, baffles, and acoustic damping.
Figure 2:
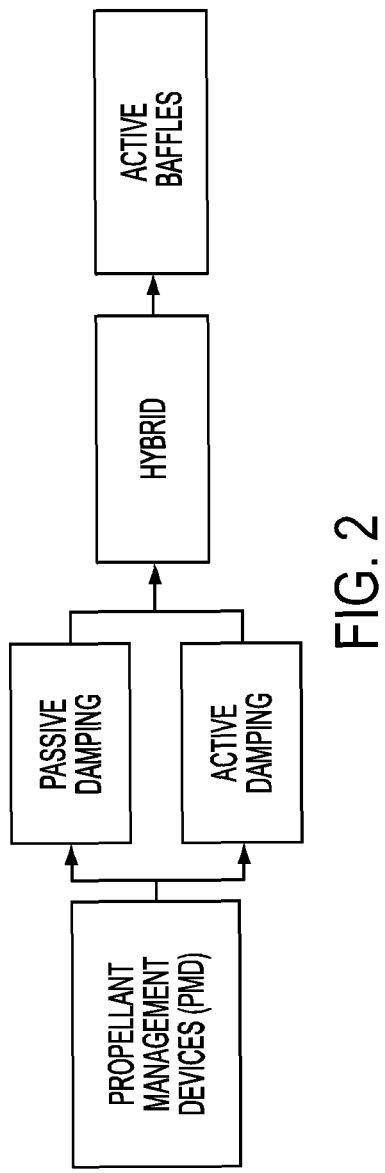
FIG. 2 illustrates a novel hybrid technique that combines passive and active damping of fluid slosh through the utilization of active baffles.

Each embodiment of the present disclosure generally involves the use of active baffles to create a hybrid system that combines the benefits of passive damping and active damping as shown in FIG. 2. In other words, the present disclosure uses baffles, particularly floating baffles, similar to known passive systems, but provides a means for controlling the baffles, thereby rendering the baffles "active." Furthermore, this hybrid system preserves the natural frequency increase and kinetic energy interactions that have been shown to be advantageous in both known wall-fixed and known floating baffle propellant management devices.

The active baffles are generally classified as floating because the active baffles have a buoyancy that allows them to float along the free surface of the liquid in the container. The ability to float allows the active baffles to provide damping at substantially all fill levels and orientations of the tank. This is particularly important in aircraft or spacecraft PMDs where the fuel is being burned and the vehicle is not always oriented in the same direction as it travels. When not activated, each active baffle may be free floating along all six degrees of freedom. In other embodiments, each active baffle could be constrained in its movement along one or more of the degrees of freedom. In some cases, the active baffles may be referred to as micro-baffles. The term "micro" should be understood to reflect the relatively small size of each individual active baffle relative to the free surface area of liquid. The term "micro" should not be limited to any particular mathematical definition of size.

According to embodiments of the present disclosure, the active baffles may be "activated" in the presence of a magnetic field. In some embodiments, the magnetic field may be applied at all times, and in other embodiments the magnetic field may be selectively presented to the active baffles. In some embodiments, the magnetic field is generated by an electro-magnet that can be selectively activated and deactivated with the use of electric current. Therefore, in some instances, the active baffles may be described as electro-active. Generation of the magnetic field using an electromagnet may be preferred because the strength of the field can be varied by changing the current. Upon exposure to magnetic fields of varying strength, the rigidity of the structural layer formed by the active baffles could adapt to various slosh conditions.

Figure 3:
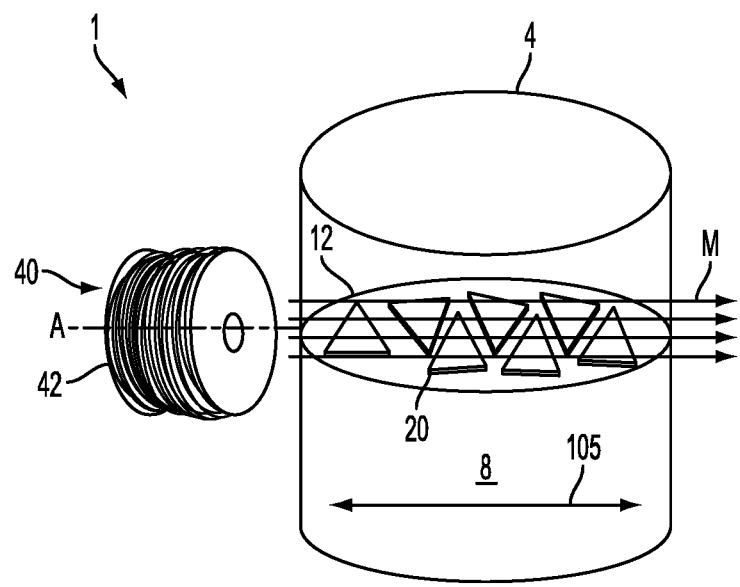
FIG. 3 illustrates the basic concept of combining passive and active fluid slosh damping elements according to one embodiment of the present disclosure.

FIG. 3 illustrates the basic slosh damping system 1 combining passive and active damping elements in one embodiment. The system 1 can include a tank 4 capable of containing a liquid 8, such as fuel. The liquid 8 can fill the tank 4 to various levels. Generally, at least some headspace will be present resulting in a free surface 12 of the liquid 8 that is not in direct contact with a wall of the tank 4. The system 1 can also include a plurality of active baffles 20. The number of active baffles 20 may vary based upon the dimensions of the tank 4 and the potential area of the free surface 12. The quantity of active baffles 20 may be selected to include as many baffles as possible to create a single layer of baffles along the free surface 12 in the most likely orientation. In most embodiments, the active baffles 20 are configured to float upon the liquid 8 when a sufficient volume of liquid is present in the tank 4. The active baffles 20 are also capable of being manipulated by an actuator 40 to create a semi-rigid structural layer at the free surface 12 of the liquid 8. As discussed above, the active baffles 20 may be manipulated by a magnetic field M, in which case the actuator 40 may include a permanent magnet or an electromagnet. FIG. 3 shows the actuator 40 comprising coiled wire forming an electromagnet 42. The electromagnet 42 may be mounted outside of the tank 4 with the axis A of the electromagnet parallel with a slosh direction 105 and along the free surface 12 of the liquid 8. As should be understood, the axis A of a magnet is the axis between opposite poles thereof.

Figure 4:
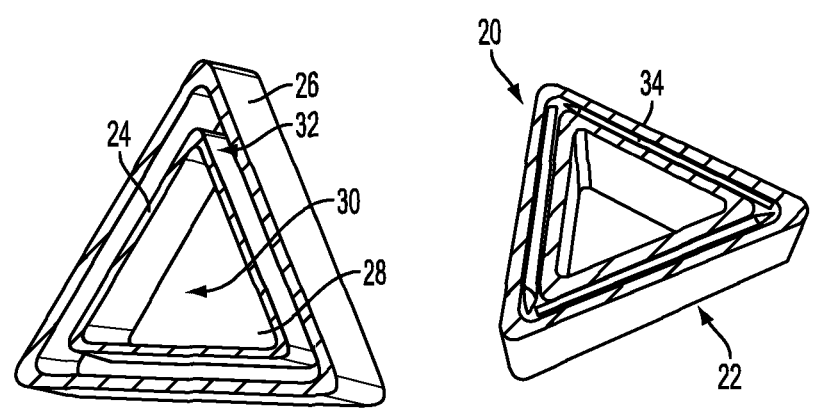
FIG. 4 illustrates a cross section of an active baffle according to one embodiment of the present disclosure.

The active baffles 20 may take a variety of forms, shapes, sizes, and configurations made from a variety of materials so long as the active baffles 20 are capable of at least partially floating upon the free surface 12 of the liquid and respond to the actuator 40. FIG. 4 shows a cross section of an active baffle 20 according to one embodiment. The active baffle 20 includes a body 22 having an inner peripheral wall 24, an outer peripheral wall 26, a bottom wall 28 and a top wall (not shown). The inner peripheral wall 24 at least partially defines an air chamber 30 to assist with the buoyancy of the active baffle 20. A channel 32 is formed between the inner and outer peripheral walls 24, 26. The channel 32 is then at least partially filled with an activation material 34 to allow the active baffle 20 to respond to the electromagnet 42. Therefore the activation material 34 will at least partially surround the air chamber 30.

The body may be made from various materials. In the illustrated embodiment Acrylonitrile Butadiene Styrene (ABS) plastic and Polylactic Acid (PLA) plastic were used. These materials are preferred for their light weight and low density. Other metals, polymers and composites may be used based on their strength, buoyancy, manufacturability and reactivity with the liquid being used.

The body 22 of the illustrated embodiment, used in the experiments below, is an equilateral triangle with 1.5 inch long sides and a 0.4 inch thickness. The channel 32 is 0.075 inches wide along the perimeter. The active baffles 20 should not be limited to the specific or relative dimensions of the embodiment used in the experiments below.

The equilateral triangle shape of the body 22 was determined to be advantageous. Other shapes, however, may also be used, such as hexagonal, square, rectangular, circular or a combination of shapes. Preferably, the active baffles 20 may have shapes, such as the equilateral triangle, that allow them to join together in a relatively close-packed or substantially inter-fitting configuration under influence by the magnetic field.

The activation material 34 may vary, keeping in mind that modification of the type and amount of activation material embedded within the active baffle 20 has a direct effect on the buoyancy to keep the active baffle afloat. The activation material 34 should be one that preserves the magnetic flux which is transmitted through the baffles, and preferably be as magnetically permeable as possible. Example activation materials include Carbonyl Iron (CI) particles, ferrofluid and solution mixtures thereof. Baffles embedded solely with CI particles may be preferred. Other even more highly permeable materials such as Metglas may also be used.

Magnetic permeability is defined as a measure of the ability of a substance to sustain a magnetic field. With the exception of several man-made alloys and other magnetic mediums, raw iron offers the highest permeability value. Table 1 lists relative permeability values for a variety of materials.

TABLE 1

| Material | Relative Permeability | Material | Relative Permeability |
| --- | --- | --- | --- |
| Wood | ~1.0 | Aluminum | ~1.0 |
| Stainless Steel (martensitic, hardened) | 40-95 | Stainless Steel (martensitic, annealed) | 750-950 |
| Iron (various) | 5,000-200,000 | Metglas | 1,000,000 |

Again, the actuator 40 may take various forms. In many embodiments the actuator 40 provides a magnetic field, preferably one where the flux lines emanate far from the pole of the magnet, through the full diameter of the tank. The governing equation for the pole strength (in Tesla), of an electromagnet is equal to:

$$P = \frac{N \times I \times A}{L}$$

where N is the number of turns, I is the current, A is the cross-sectional area of the core, and L is the length of the core.

Examples of actuators 40 include, but are not limited to modified solenoids, electromagnets 42, and bar magnets. The electromagnet 42 used for all slosh tests was made from 600 ft. of 18 gauge wire, and a 0.75" steel pipe fitting core, 1.5" long. Conduit plates were used as end caps and a 0.75" thick steel bolt was filed to fit into the pipe fitting after the wire was wound. The 18 gauge wire used for the electromagnet has a cross sectional area of 0.823 square inches and maximum current of 2.3 amperes. Compared to the 6.5 cm influence range of the most effective solenoid, the current electromagnet has an influence range of approximately 20.0 cm.

Figure 5:
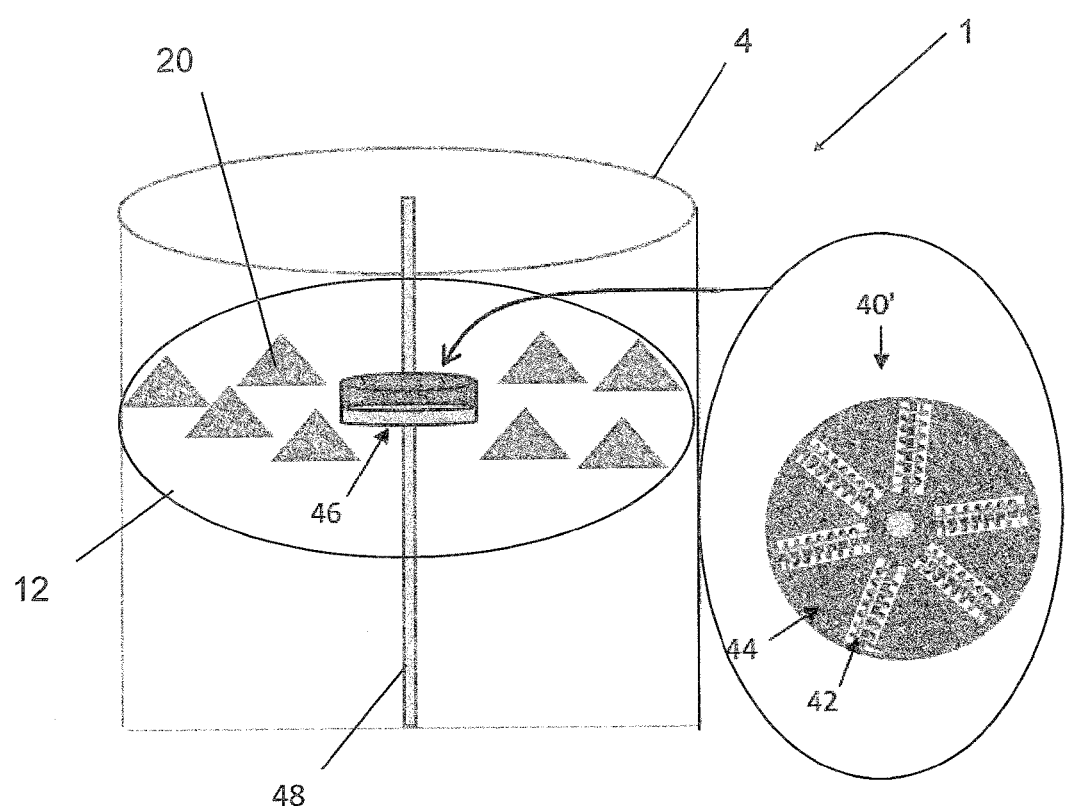
FIG. 5 illustrates the basic concept of combining passive and active fluid slosh damping elements according to another embodiment of the present disclosure, including a detailed view of a floating actuator.

FIG. 5 shows a second embodiment of the slosh damping system 1. The second embodiment is similar to the embodiment of FIG. 3, but includes a floating actuator 40' disposed within the tank 4. The floating actuator 40' can includes a plurality of separate electromagnets 42. The electromagnets 42 may be arrayed around an actuator axis with each magnet axis arranged in a radial direction relative to the actuator axis. The floating actuator 40' may include a support material 44 configured to hold the plurality of electromagnets 42. The floating actuator 40' may also include a buoy 46. The buoy 46 and the support material 44 may combine to allow the floating actuator 40' to rest upon the free surface of the fluid. By providing a plurality of electromagnets 42, each having a unique magnet axis direction, each electromagnet could be selectively and individually energized so that the energized electromagnet 42 is the one with a magnet axis most closely parallel to the slosh direction at any given time.

In some embodiments, the actuators 40, 40' may be mounted outside the tank (FIGS. 3 and 6) or inside the tank (FIGS. 5 and 7) in a manner that allows the actuator to adjust as the height and/or orientation of the free surface 12 moves in response to changing orientations of the tank or changes in volume or quantity of the liquid. In the example of the floating actuator 40', adjustment is provided by the buoyant nature thereof. In some embodiments, a guide 48 may be provided to restrain the motion of the floating actuator 40'.

Figure 6A:
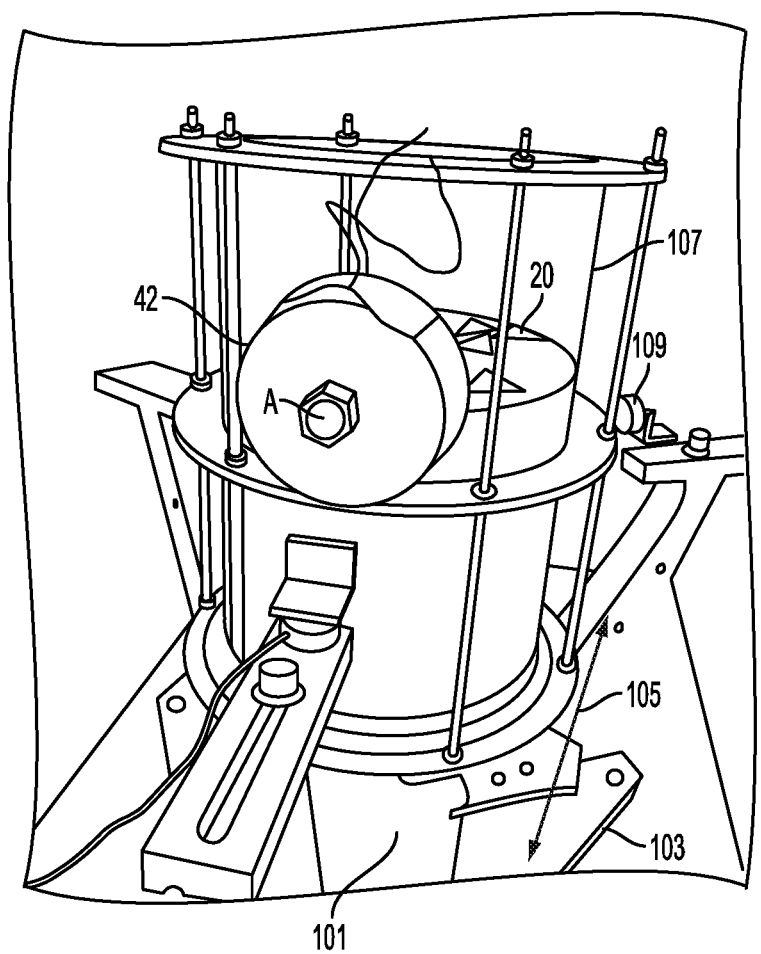
FIGS. 6A, 6B and 6C show several views of an experimental setup utilizing one embodiment of a fluid slosh damping system according to the present disclosure.
Figure 6C:
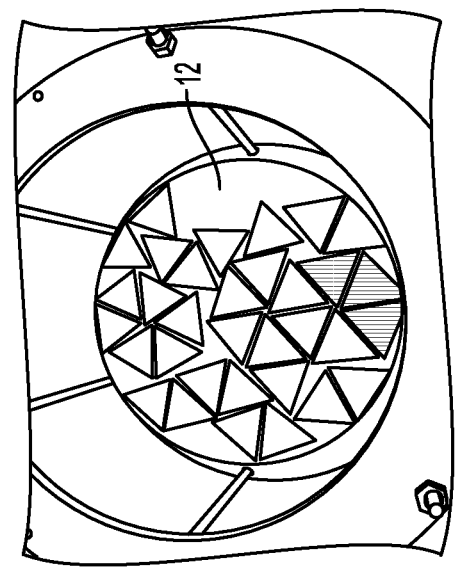
Figure 6B:
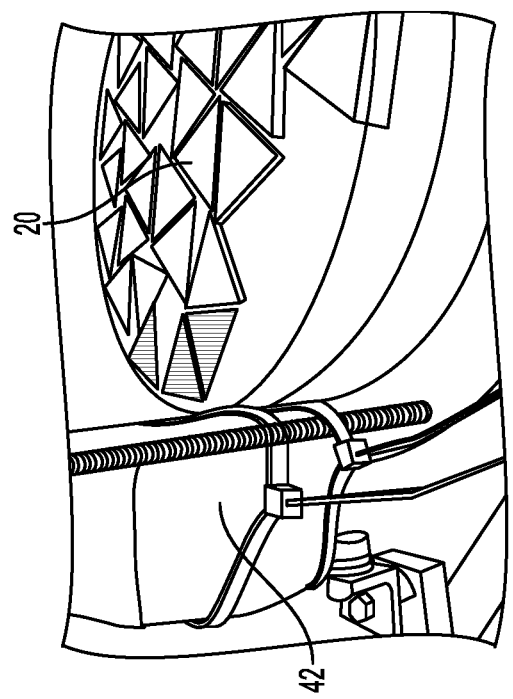

A first embodiment of the present slosh damping system 1 is illustrated by a first experimental setup illustrated in FIGS. 6A-6C. The setup includes a dynamic force-balance 101 fixed to a single axis linear motion actuator 103. Sloshing is generated in a lateral sloshing direction 105 by providing a mechanical frequency of given amplitude. A container 107 is held by arms linked to dynamic load cells 109 to measure the forces acting on the walls of the container 107. The first experimental setup includes the electromagnet 42 mounted outside of the container 107 with the axis of the electromagnet parallel with the slosh direction and along the free surface 12 of the liquid 8. As should be understood, the axis A of a magnet is the axis between opposite poles thereof. FIG. 6B shows a detailed view of the first experimental setup. FIG. 6C shows a top view of the first experimental setup.

Figure 7:
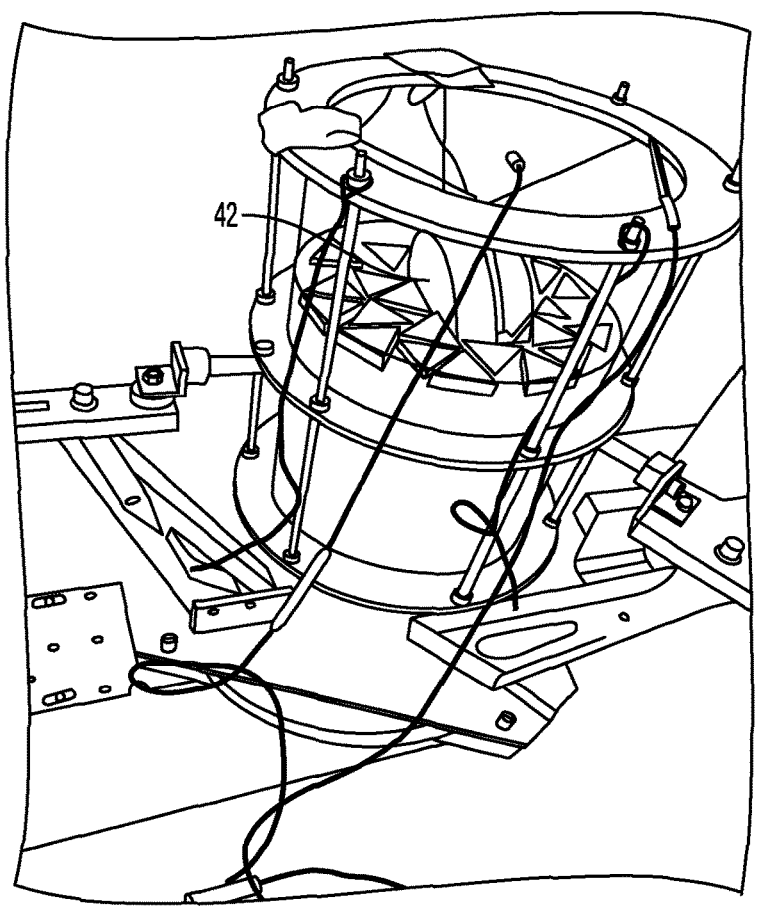
FIG. 7 shows an experimental setup of a second embodiment of a fluid slosh damping system according to the present disclosure.

A second embodiment of the present slosh damping system 1 is illustrated by a second experimental setup illustrated in FIG. 7. The embodiment of FIG. 7 is substantially similar to the embodiment of FIGS. 6A-6C, but the electromagnet of the first setup has been suspended in a hanging fashion within the container 107. The electromagnet 42 is still oriented with its axis generally along the free surface 12 of the liquid 8 and generally parallel with the slosh direction. The electromagnet 42 of the second setup was hung in a manor to minimize the motion of the magnet itself during the slosh tests. In addition, in some applications, as a supply of fuel or other liquid in the tank or container is depleted, a further longitudinal translation of the moving fuel can occur, to at least some extent, leading to increased sloshing. In cases of extreme sloshing, the magnet or other actuator can be mounted in a manner so as to move with the free surface of the fuel. In one example embodiment, the magnet or actuator can comprise a design that includes an array of smaller buoyant magnets, as opposed to the use of larger size magnets in a relatively fixed orientation with respect to the liquid surface, as illustrated in, for example, FIG. 5 or 7. The magnets of such an array of magnets can be mounted so as to enable them to move with the surface, much like the baffles.

Experiments outlined herein were conducted using an 8 inch diameter tank. The container 107, as shown in FIG. 6A, was filled with testing fluid 60% by volume, which has been identified through experimental testing to induce maximum slosh amplitude. The testing fluid was water, however, common rocket propellant, hydrazine, is substantially physically similar. The container 107 was left open at the top for ease of access.

Figure 8:
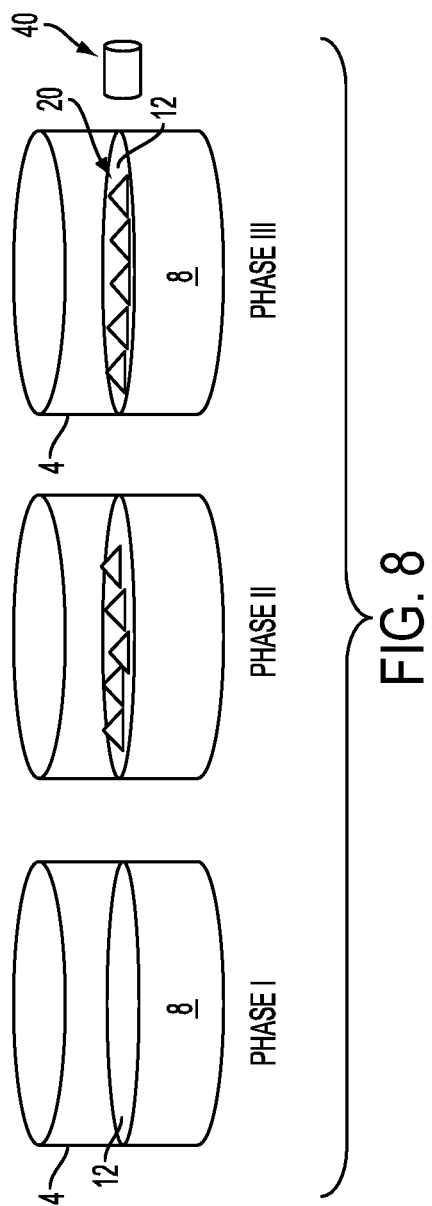
FIG. 8 illustrates the testing phases for experiments conducted using active baffles.
Figure 9:
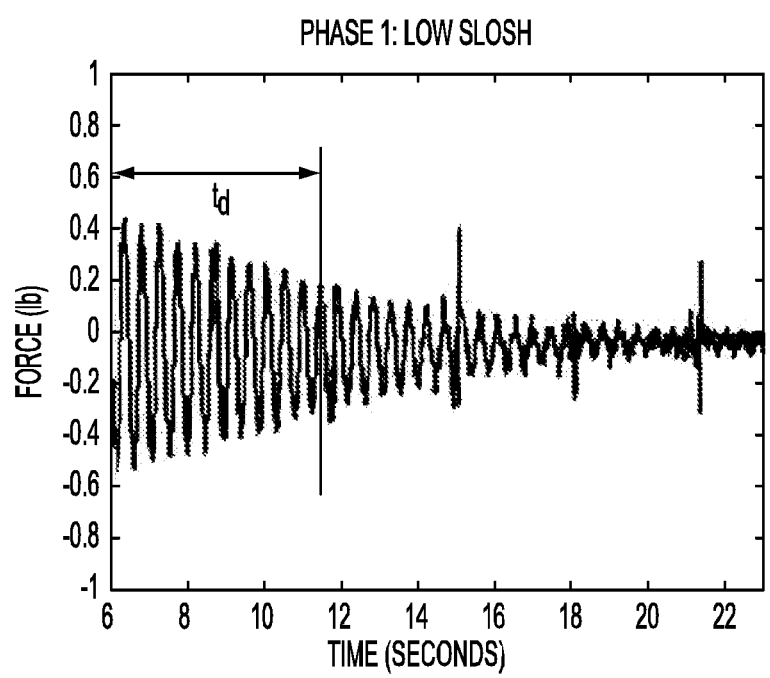
FIGS. 9-14 are graphical illustrations of the force output recorded during high and low slosh tests for each phase of experimental testing conducted.
Figure 10:
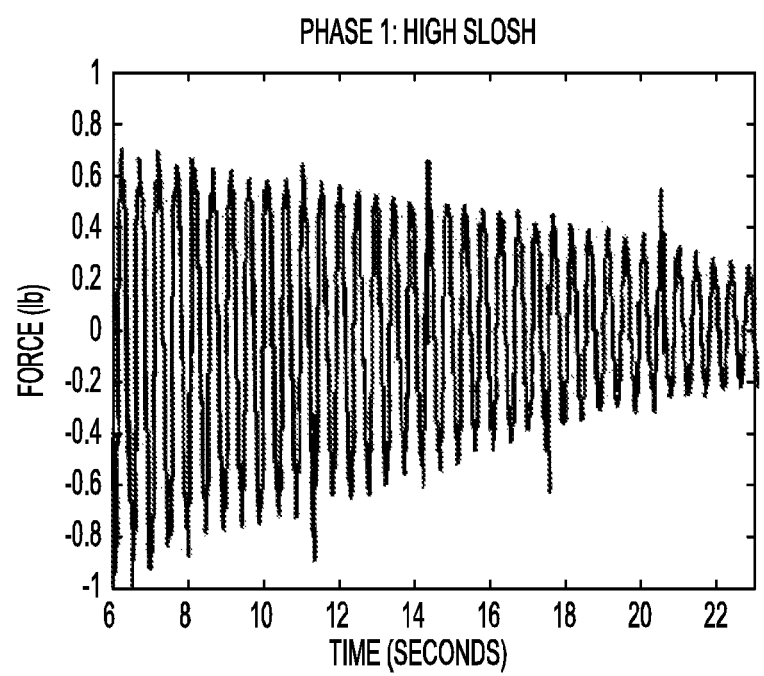
Figure 11:
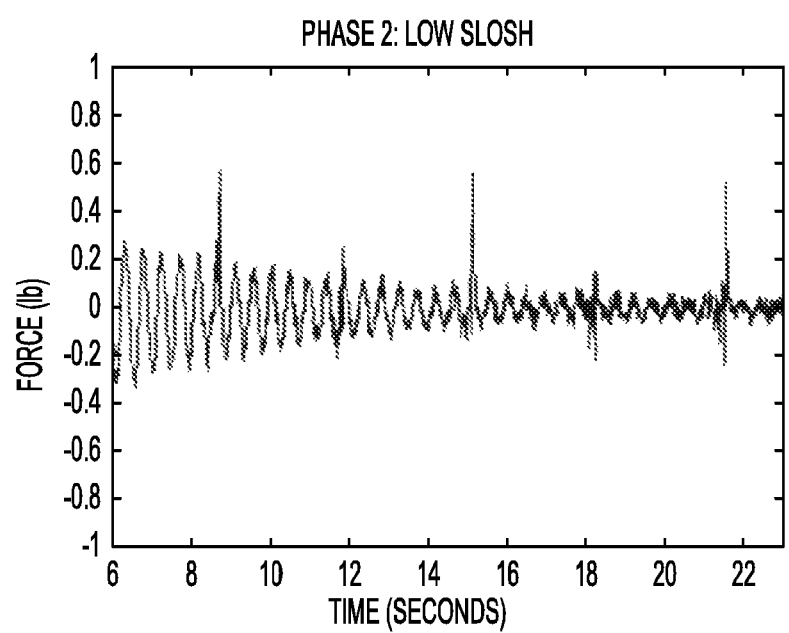
Figure 12:
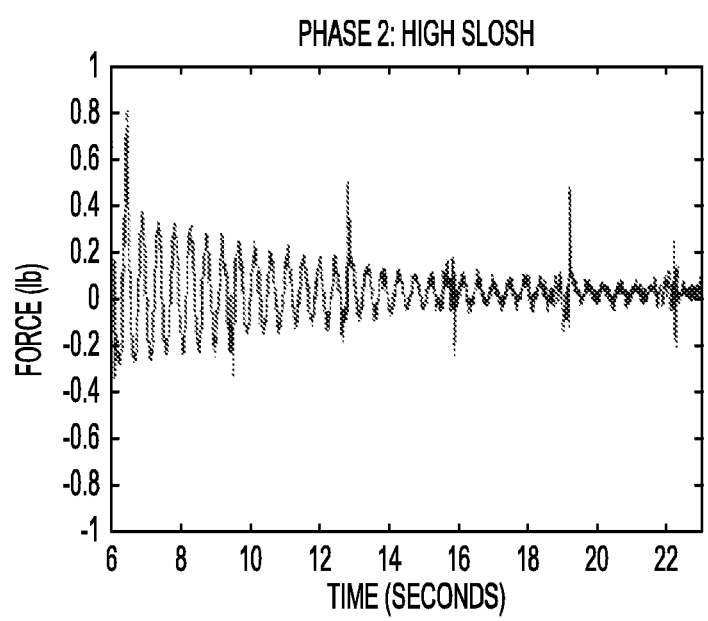
Figure 13:
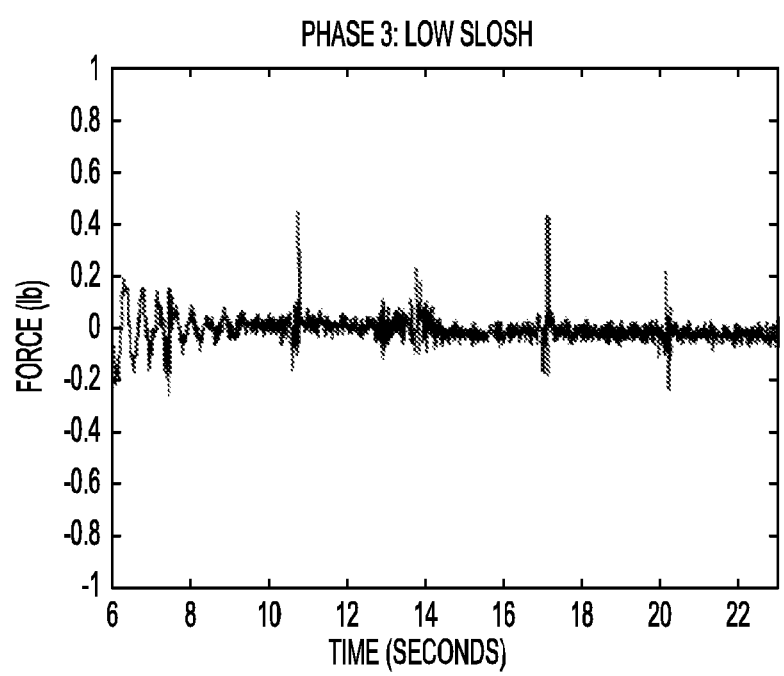
Figure 14:
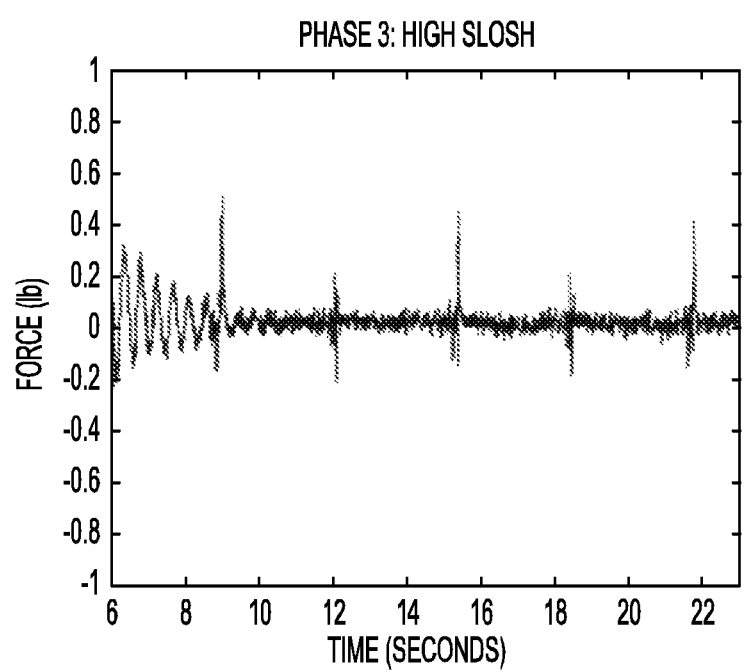

The experimental testing was conducted in three phases as illustrated in FIG. 8. The first phase characterized baseline sloshing values for the testing fluid within the container, i.e., free sloshing. The second phase repeated the experiment to evaluate the degree of damping present due to active baffles 20 floating on the free surface without a magnetic field. The active baffles 20 were activated during peak sloshing in the third phase of testing. Each of the three phases was repeated for two test cases: "low" sloshing and "high" sloshing. Low sloshing corresponds to a condition such that the slosh waves reach a height that is 12.5% of the container diameter in response to a 2.3 mm displacement of the container at 2 Hz. Similarly, high sloshing waves reach a height that is 25.0% of the container diameter in response to a 3.1 mm displacement of the container at 2 Hz. Table 2 below outlines the parameters used for each test case using the first experimental setup with the actuator outside of the container.

TABLE 2

| Test Case | Amplitude, A (mm) | Frequency, $f_n$ ($H_Z$) | Cycles, $N_c$ |
| --- | --- | --- | --- |
| Low Sloshing | 2.3 | 2.0 | 10 |
| High Sloshing | 3.1 | 2.0 | 10 |

Testing for both phases was started by generating the sloshing laterally until a natural frequency was reached, i.e., the peak of its sloshing activity. The agitation of the tank was then stopped to allow natural damping to occur during a period of remnant slosh. This allowed for a period of time in order to achieve complete damping. The amount of damping present may be characterized by a damping factor based upon the time it takes the remnant slosh to dissipate and return to equilibrium. The damping factor is:

$$\varepsilon = \frac{\delta}{\sqrt{(2\pi + \delta^2)}}$$

Where, δ is the logarithmic decrement.

Figure 15:
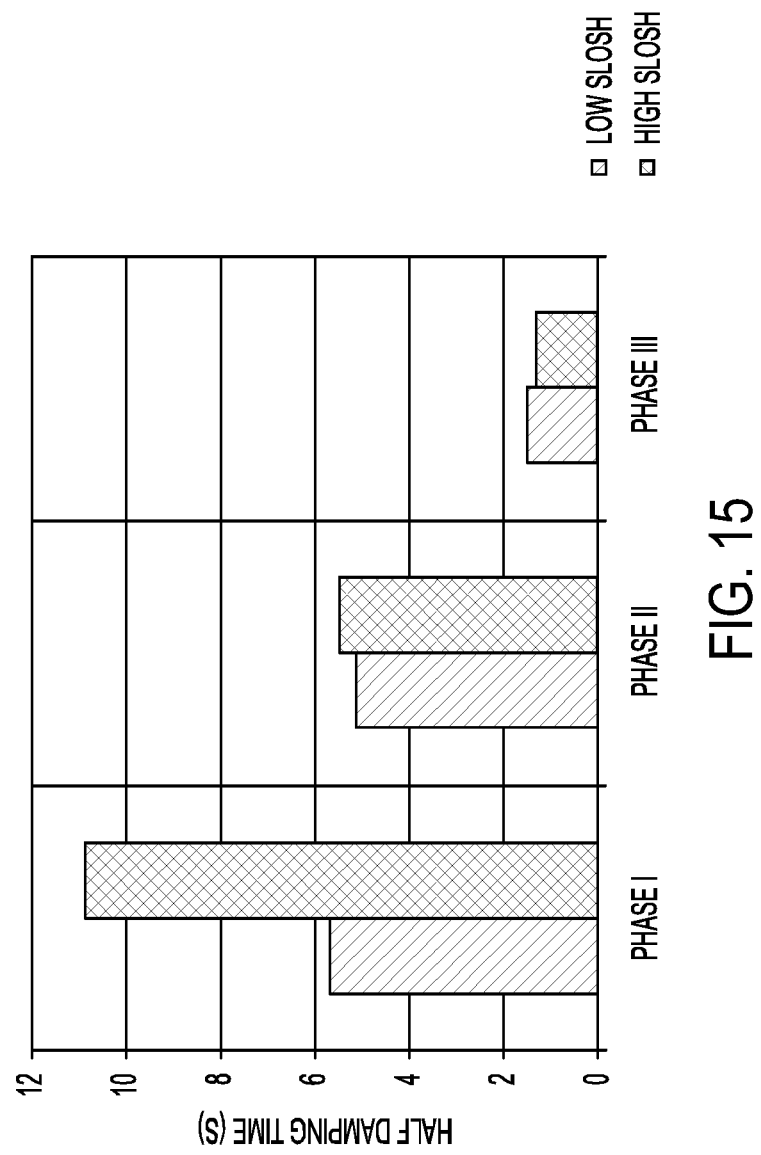
FIG. 15 illustrates a summary of the results achieved for each phase of experimental testing under both low fluid slosh and high fluid slosh conditions.

The damping effect was characterized initially by the force signal immediately after the point in time where actuation of the linear actuator has ceased, i.e. the beginning of remnant sloshing. For the purpose of comparison, the damping time was defined as the time it takes for the remnant sloshing peak-to-peak amplitude to reduce to half its initial magnitude. FIGS. 9 through 14 compare the force output that was recorded for all six test iterations as remnant sloshing was dissipated. FIG. 15 illustrates a summary of the results achieved for each phase of experimental testing under both low slosh and high slosh conditions. During the experimental testing, a noise signal appeared on an average of every four seconds producing a set of false peaks seen in the figures.

Visually, the activated baffle tests indicated a quicker damping time over the inactive baffle and free-slosh tests. Table 3 quantifies the damping times, $t_d$, for each test iteration using the first setup of FIG. 5, having the external electromagnet 42. The active baffles 20 covered approximately 85% percent of the free surface 12 during these tests.

TABLE 3

| Phase | Test Case | $T_d$(s) | % difference to free-slosh condition |
|---|---|---|---|
| Phase I | Low | 5.7 | N/A |
| | High | 10.9 | N/A |
| Phase II | Low | 5.1 | 10.5 |
| | High | 5.5 | 49.5 |
| Phase III | Low | 1.5 | 73.7 |
| | High | 1.3 | 88.1 |

As seen from Table 3, the active baffles subject to the magnetic field induce up to an 88% reduction to the damping time of the free-slosh test case, and also provide a significant improvement over the floating baffles themselves. When the tests were run with the electromagnet hung inside the tank as shown in the second set up, the active baffles achieved a more organized pattern under influence of the magnetic field and further reduced the damping time.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed:

1. A baffle for passive and active damping movement of a liquid within a tank, vessel or container comprising:
    a body configured to float upon a surface of the liquid; and
    an activation material received within the body,
    wherein the activation material comprises a magnetically permeable material, and
    wherein the body is provided with a volume of activation material sufficient to enable the body to be manipulated in the presence of a selectively generated magnetic field that activates and moves the baffle with a series of other baffles into at least a semi-rigid structural layer while substantially remaining afloat along a surface of the liquid.

2. The baffle according to claim 1, wherein
the activation material has a magnetic permeability of at least 5,000.

3. The baffle according to claim 1, wherein
the body further comprises an air chamber at least partially surrounded by the activation material.

4. The baffle according to claim 1, wherein
the body has a top wall, a bottom wall, and a peripheral wall,
wherein the top surface has a substantially triangular shape.

5. The baffle according to claim 1, wherein the body comprises a material having a low density and low reactivity with the liquid in which the baffle is placed.

6. A system for damping slosh of a liquid within a tank, comprising:
    a plurality of baffles, each baffle comprising:
        a body configured to substantially float upon the liquid; and
        an activation material received along at least a portion of the body,
            wherein the activation material comprises a magnetically reactive material in a quantity sufficient to enable the body to be manipulated in the presence of a magnetic field; and
    an actuator configured to generate the magnetic field sufficient to activate and to move at least a portion of the baffles into a structural layer floating upon the liquid, and wherein as the magnetic field is varied, a rigidity of the structural layer is adjusted to adapt to varying slosh conditions.

7. The system according to claim 6, wherein
the activation material has a magnetic permeability of at least 5,000.

8. The system according to claim 6, wherein
the body includes an air chamber at least partially surrounded by the activation material.

9. The system according to claim 6, wherein the actuator comprises a magnet having an axis between opposite poles thereof, and wherein the magnet is positioned with respect to the tank and the liquid such that the axis is substantially parallel to a slosh direction of the liquid within the tank and substantially along a free surface of the liquid during equilibrium.

10. The system according to claim 9, wherein the magnet is configured to be mounted outside of the tank.

11. The system according to claim 9, wherein the magnet is configured to be mounted within the tank.

12. The system according to claim 6, wherein the actuator is adapted to be movable relative to the tank to adjust for changes in the volume of liquid within the tank.

13. The system according to claim 6, wherein the actuator comprises an electromagnet.

14. The system according to claim 6, wherein the body comprises a buoyant material having a low density and low reactivity with the liquid in which the baffle is placed.

15. A method of damping slosh of a liquid held within a tank, comprising:
    floating a plurality of baffles upon a surface of the liquid, each baffle comprising a body configured to substantially float upon the liquid and having an activation material therein, the actuation material provided in quantity sufficient to enable the baffle to be manipulated in the presence of a magnetic field;
    creating a magnetic field in proximity to the liquid; and
    moving the baffles into a semi-rigid structural layer substantially floating along the surface of the liquid in response to the magnetic field.

16. The method according to claim 15, wherein creating the magnetic field comprises passing a current through an electromagnet.

17. The method according to claim 16, further comprising:
    adjusting the current passing through the electromagnet to change a rigidity of the structural layer created by the baffles.

18. The method according to claim 15, wherein creating the magnetic field comprises:
    aligning an axis of a magnet generally parallel with a slosh direction of the liquid, and with the axis generally extending along the free surface during equilibrium.

19. The method according to claim 18, further comprising:
    adjusting the position of the magnet creating the magnetic field as a volume of liquid within the tank changes.

20. The method according to claim 15, wherein each of the baffles include an air chamber at least partially surrounded by the activation material to enhance the buoyancy of the baffles for floating upon the surface of the liquid.

* * * * *